US 6,531,014 B1

(12) United States Patent
Kobayashi et al.

(10) Patent No.: US 6,531,014 B1
(45) Date of Patent: Mar. 11, 2003

(54) PROCESS FOR MAKING ELASTICALLY STRETCHABLE COMPOSITE SHEET

(75) Inventors: Toshio Kobayashi, Kagawa-ken (JP); Hideyuki Ishikawa, Kagawa-ken (JP)

(73) Assignee: Uni-Charm Corporation, Ehime-ken (JP)

( * ) Notice: Subject to any disclaimer, the term of this patent is extended or adjusted under 35 U.S.C. 154(b) by 138 days.

(21) Appl. No.: 09/610,591

(22) Filed: Jul. 5, 2000

(30) Foreign Application Priority Data

Jul. 5, 1999 (JP) ............................................. 11-190934

(51) Int. Cl.⁷ .............................. D04H 1/54; D04H 3/00
(52) U.S. Cl. ...................... 156/181; 156/73.2; 156/148; 156/167; 156/209; 156/229; 156/290
(58) Field of Search ................................ 156/62.2, 181, 156/209, 229, 290, 73.2, 148, 167; 264/173.15, 257, DIG. 73

(56) References Cited

U.S. PATENT DOCUMENTS 4,209,563 A * 6/1980 Sisson .......................... 156/167

5,683,787 A * 11/1997 Boich et al. ................. 156/163

FOREIGN PATENT DOCUMENTS

| JP | 7-37703 | 4/1995 |
| WO | 92/16371 | 10/1992 |
| WO | 96/38620 | 12/1996 |

* cited by examiner

Primary Examiner—Sam Chuan Yao
(74) Attorney, Agent, or Firm—Lowe Hauptman Gilman & Berner, LLP

(57) ABSTRACT

A process for making an elastically stretchable composite sheet having a relatively low basis weight. An elastically stretchable second web is placed upon a first web comprising stretchable first continuous fibers and the first and second webs are intermittently bonded together to obtained a first composite web which is stretched under a plastic deformation of the first continuous fibers and then elastically contracted to obtain a second composite web.

10 Claims, 3 Drawing Sheets

PROCESS FOR MAKING ELASTICALLY STRETCHABLE COMPOSITE SHEET

BACKGROUND OF THE INVENTION

This invention relates to a process for making an elastically stretchable composite sheet and more particularly to such a composite sheet of comfortable touch being suitable as an important component of disposable garments such as disposable diapers, sanitary napkins and disposable gowns used in medical site.

Japanese Patent Publication No. 1995-37703 discloses a process for making a nonwoven elastic sheet comprising the steps of a continuously feeding elastic web with a tension in a machine direction, placing a fibrous web on the upper surface of the elastic web, bonding them together by heat- or ultrasonic-sealing and relaxing the elastic web to contract so that the fibrous web may form gathers. The nonwoven elastic sheet thus obtained has an elasticity generated by the presence of the elastic web and a comfortably soft touch so that such nonwoven elastic sheet may be suitably used as cover material of disposable diapers or sanitary napkins.

However, the process of prior art is necessarily accompanied with a problem that a basis weight of the fibrous web being fed inevitably increases as the elastic web contracts after the fibrous web has been sealed with the elastic web.

SUMMARY OF THE INVENTION

This invention aims to provide a process for making an elastically stretchable composite sheet enabling the fibrous web in the finished composite sheet to maintain substantially the same basis weight as that of the fibrous web being fed and thereby to solve the problem in the process of prior art.

According to this invention, a process for making a composite sheet comprising a step of bonding a first web made of thermoplastic synthetic fibers and having an inelastic stretchability in one direction a first to at least one surface of a second web made of thermoplastic synthetic fibers having an elastic stretchability at least in the one direction and thereby to obtain the composite sheet having an elastic stretchability in the one direction, wherein:

the first web is made of stretchable synthetic continuous fibers having a breaking extension at least of 70% while the second web has its breaking extension higher than that of the first web and the first and second webs are bonded in accordance with the steps of:
 a. continuously feeding the first web in the one direction;
 b. continuously feeding the second web in the one direction so as to be placed upon the first web;
 c. bonding the first and second webs together intermittently at least along the one direction rather than in a direction being orthogonal to the one direction;
 d. stretching the first and second webs bonded together at least in the one direction rather than the direction being orthogonal to the one direction within a critical elasticity of the second web and a critical breaking extension of the first web; and
 e. elastically relating the stretched first and second webs to contract them and thereby to obtain the composite sheet.

The composite sheet obtained by the process according to this invention is easily stretchable and offers a comfortable touch, so that the composite sheet is suitable as cloth and/or elastic member in disposable garments such as disposable pants or disposable gowns used in medical site.

The process according to this invention for making the elastically stretchable composite sheet enables the fibrous web in the composite sheet to have a basis weight lower than that in the conventional composite sheet because the stretchable fibrous web is laminated in its unstretched condition with the elastically stretchable web.

With the composite sheet of this invention, the component fibers of the fibrous web are stretched under a plastic deformation and have their diameter correspondingly reduced as the composite sheet is stretched once in the course of the process. At the same time, undesirable bonding and/or entangling among the component fibers themselves in the fibrous web and undesirable bonding between the fibrous web and the elastically stretchable web are loosened. Therefore, a relatively small force required to stretch the elastically stretchable web is sufficient as an initial force required to stretch the composite sheet so that the composite sheet may be easily stretched and offer a comfortable soft touch.

DETAILED DESCRIPTION OF THE PREFERRED EMBODIMENTS

Details of a process for making an elastically stretchable composite sheet according to this invention will be more fully understood from the description given hereunder with reference to the accompanying drawings.

Figure 1:
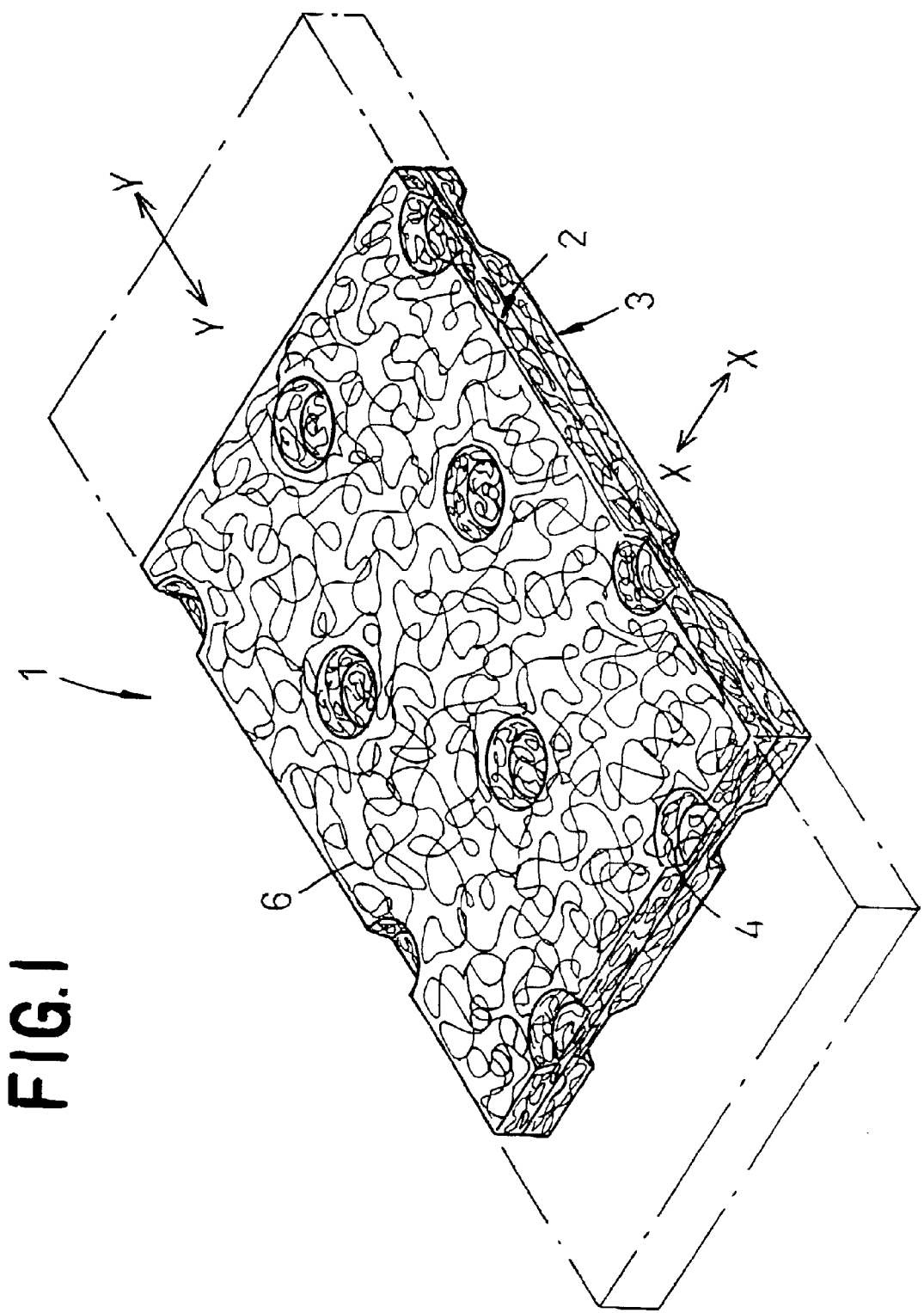
FIG. 1 is a perspective view showing an elastically stretchable composite sheet.

An elastically stretchable composite sheet 1 shown by FIG. 1 in a perspective view comprises an upper layer 2 and a lower layer 3 bonded together in their bond regions 4. The composite sheet 1 is elastically stretchable and contractable at least in a direction indicated by a double-headed arrow Y—Y rather than in a direction indicated by a double-headed arrow X—X being orthogonal to the direction Y—Y.

The upper layer 2 of the composite sheet 1 is inelastically stretchable at least in the direction Y—Y rather than in The direction X—X. The upper layer 2 is an assembly of thermoplastic synthetic resin continuous fibers 6. Preferably, the fibers 6 are bonded together only in the bond regions 4 and not in the remaining region defined around the bond regions 4 so that, in the remaining region, the continuous fibers 6 may extend over the upper surface of the lower layer 3 so as to describe irregular curves. In response to stretching of the composite sheet 1 in the direction Y—Y and/or in the direction X—X, the continuous fibers 6 describing the curves are reoriented to extend in the direction Y—Y and the upper layer 2 is inelastically stretched. The continuous fibers 6 may be of synthetic resin such as polypropyrene, polyester or polyethylene.

The lower layer 3 of the composite sheet 1 comprises a sheet which is elastically stretchable in the direction Y—Y, preferably both in the direction Y—Y and in the direction X—X. This sheet has a stretch ratio of at least 200%, preferably at least 400% in the direction Y—Y and elastically contractable by less than 1.3 times of its initial length after stretched by 100%. Such sheet may be a carded web, a nonwoven fabric made of elastic threads such as a thermal bond nonwoven fabric or a spun lace nonwoven fabric, a woven fabric made of elastic threads, or a film made of thermoplastic elastomer.

The upper and lower layers 2, 3 may be bonded together in the bond regions 4 by heating these two layers 2, 3 under a pressure or by ultrasonic-sealing them. It is also possible to mechanically entangle the continuous fibers 6 of the upper layer 2 with the component fibers of the lower layer 3. In this case, the entangling effect may be achieved by needle punching, high pressure water streams or the like. Each of the bond regions 4 is preferably dimensioned in a range of 0.03–10 $mm_2$ so that the bond regions 4 may occupy 1–50% of a total area of the composite sheet 1.

When such composite sheet 1 is stretched, for example, in the direction Y—Y, the lower layer 3 is elastically stretched in the direction Y—Y and the continuous fibers 6 of the upper layer 2 normally describing the curves are reoriented to be inelastcially stretched in the direction Y—Y. A force required to stretch the composite sheet 1 substantially a force required to stretch only the lower layer 3 since no significant force is required for the upper layer 2 to reorient its continuous fibers 6. In other words, the upper layer 2 has little influence upon the force required to stretch the composite sheet 1. Further stretching of the composite sheet 1 with the lower layer 3 being elastically deformed causes the still curved continuous fibers 6 to be straightened in the region extending around the bond regions 4 in which the continuous fibers 6 are bonded to the lower layer 3. To stretch the composite sheet 1 further from such condition, a force is required, in addition to the force required to stretch the lower layer 3, to stretch the straightened continuous fibers 6.

Figure 2:
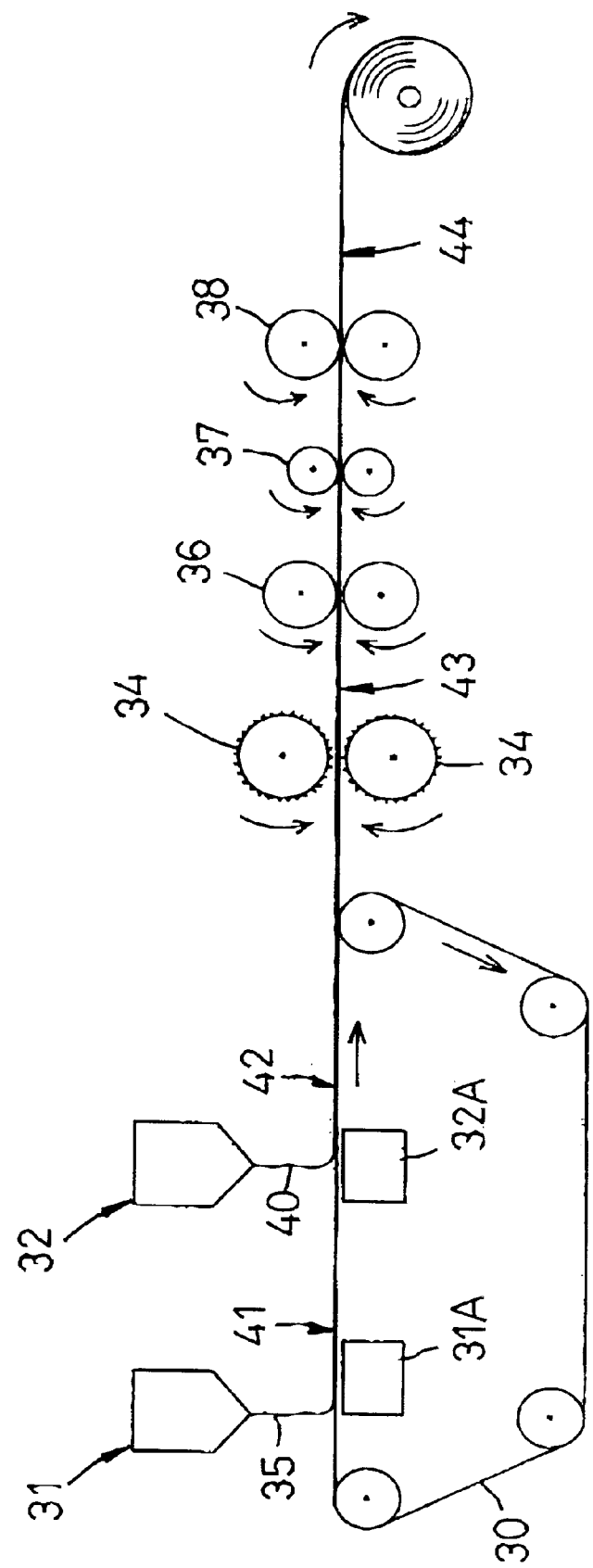
FIG. 2 is a diagram schematically illustrating the steps of a process according to an embodiment of this invention for making the composite sheet.

FIG. 2 is a diagram schematically illustrating a specific embodiment of the process for making the composite sheet 1. An endless belt 30 travels from the left hand toward the right hand as viewed in the diagram. On the left hand, there is provided a first melt blown fiber molder 31 above the belt 30 and there is provided a suction mechanism 31A below the belt 30. The first molder 31 includes a plurality of nozzles arranged transversely of the belt 30 and adapted to discharge first melt blown continuous fibers 35 of non-stretchable thermoplastic synthetic resin which are substantially in unstretched state. The continuous fibers 35 are accumulated on the belt 30 along irregular curves to form a first web 41. A discharge condition of the first molder 31 and a travelling condition of the belt 30 are selected so that the continuous fibers 35 stacked one upon another in the first web 41 may be prevented from being bonded together or, even if bonded together, the bonded continuous fibers 35 may be easily separated one from another on the subsequent step. Such unstretched first continuous fibers 35 have a breaking extension of at least 70%.

On the right side of the first molder 31, there are provided a second melt blown fiber molder 32 and a suction mechanism 32A. The second molder 32 also includes a plurality of nozzles arranged transversely of the belt 30 and adapted to discharge second melt blown continuous fibers 40 of elastically stretchable thermoplastic synthetic resin. The second melt blown continuous fibers 40 are accumulated on the first web along irregular curves to form a second web 42. A discharge condition of the second molder 32 is selected so that the second continuous fibers 40 stacked one upon another may be bonded together and thereby form a sheet having an elastic stretchability in the travelling direction of the belt 30, preferably in the travelling direction as well as in the direction being orthogonal thereto. Such second continuous fibers 40 have a breaking extension higher than that of the first continuous fibers 35.

The first and second webs 41, 42 placed upon each other are fed together to upper and lower embossing rolls 34, 34 between which the webs 41, 42 are intermittently heated under a pressure and thereby bonded together at least along the direction in which the webs 41, 42 are fed rather than along the direction orthogonal thereto. In this manner, a first composite web 43 is formed.

The first composite web 43 travels through first, second and third pairs of stretching rolls 36, 36; 37, 37; 38, 38. A revolution speed of the first and third pairs of rolls 36, 36; 38, 38 is same but lower than a revolution speed of the second pair of rolls 37, 37. A difference of the revolution speeds between the first and second pairs of rolls 36, 36; 37, 37 is adjusted so that the first composite web 43 may be stretched by a desired stretch ratio at a room temperature of 10–60° C., more preferably of 15–40° C. The first composite web 43 is then elastically contracted on the course defined between the first pair of rolls 36,36 and the second pair of rolls 37, 37 to its initial length. In this manner, a second composite web 44 is obtained.

In the course of stretching the first composite web 43, the first continuous fibers 35 are longitudinally stretched under a plastic deformation in the region around the bond regions in which the first and second webs 41, 42 are bonded together by the pair of embossing rolls 34, 34 within its critical breaking extension. As a result, the first continuous fibers 35 are elongated and their diameters are correspondingly reduced. The second web 42 comprising the second continuous fibers 40 are elastically stretched within their critical elasticity in the region extending around the bond regions. On such a step of stretching, except the bond regions in which the two webs are bonded together by the pair of embossing rolls 34, 34, it is desirable that any bonding or mechanical entangling possibly occurring among the first continuous fibers 35 forming the first web 41 may be substantially loosened or disentangled. It is also desirable that bonding effect possibly occurring between the first continuous fibers 35 and the second web 42 may be practically eliminated. The first composite web 43 preferably has a stretch ratio of 50–300%.

The second composite web 44 is taken up in the form of a roll and subsequently is cut into a desired dimension to obtain the individual composite sheets 1. The first web 41 and the second web 42 in the second composite web 44 correspond to the upper layer 2 and the lower layer 3 of the composite sheet 1 as shown in FIG. 1. The regions of the second composite web 44 in which the first and second webs are bonded together by the pair of embossing rolls 34, 34 correspond to the bond regions 4 of the composite sheet 1.

On the starting step, the first continuous fibers 35 are discharged in their substantially or completely unstretched state onto the belt 30 and, on the subsequent step, the first continuous fibers 35 are stretched under a plastic deformation at a room temperature of 10~60° C., more preferably of 15~40° C. While the first continuous fibers 35 are easily stretched at the room temperature so far as the continuous fibers 35 are unstretched threads, this invention can be effectively implemented even using stretched threads in the place of the unstretched thread so far as the stretched threads has a breaking extension.

When the second composite web 44 obtained in this manner is used as the component member of the disposable garment, the first web 41 is used so as to come in contact with the wearer's skin to prevent a poor slidability peculiar to rubber material from irritating the wearer's skin even when the second web 42 includes rubber-like material. The first continuous fibers 35 are stretched and have their diameters correspondingly reduced. Consequently, the first continuous fibers 35 thus stretched with their diameters reduced are improved in their softness and touch compared to the first continuous fibers 35 immediately after discharged. With the arrangement in which the first continuous fibers 35 of the second composite web 44 are bonded neither with themselves nor with the second web 42, a relatively small force required to stretch the second web 42 alone is sufficient to stretch the second composite web 44. Accordingly, the easily stretchable soft sheet is formed by the second composite web 44 in spite of its two-layered construction. The process according to the embodiment of FIG. 2 allows the first and second webs 41, 42 of the second composite web 44 to maintain their respective basis weights immediately after they have been discharged from the respective molders 31, 32. Additionally, the second composite web 44 generally presents a high breathability since both the first and second webs 41, 42 comprise fibrous assemblies.

The steps of the process illustrated by FIG. 2 may be modified in various manners to exploit this invention. For example, it is possible to feed the second web 42 onto the belt 30 before the first web 41 is fed onto the belt 30. It is also possible to use, in addition to the pair of embossing rolls 34, 34, the other means such as needle punching or high pressure columnar water streams in order to bond the first and second webs 41, 42. Alternatively, a third molder is provided downstream of the second molder 32 so that non-stretchable third melt blown continuous fibers discharged from this third molder may form a third web similar to the first web 41 on the second web 42 and thereby form a three-layered composite sheet 1 comprising, in addition to the first and second webs 41, 42, a third web. The first web 41 and this third web may be either identical to each other or different from each other in type of resin, fineness, and appearance inclusive of color.

Figure 3:
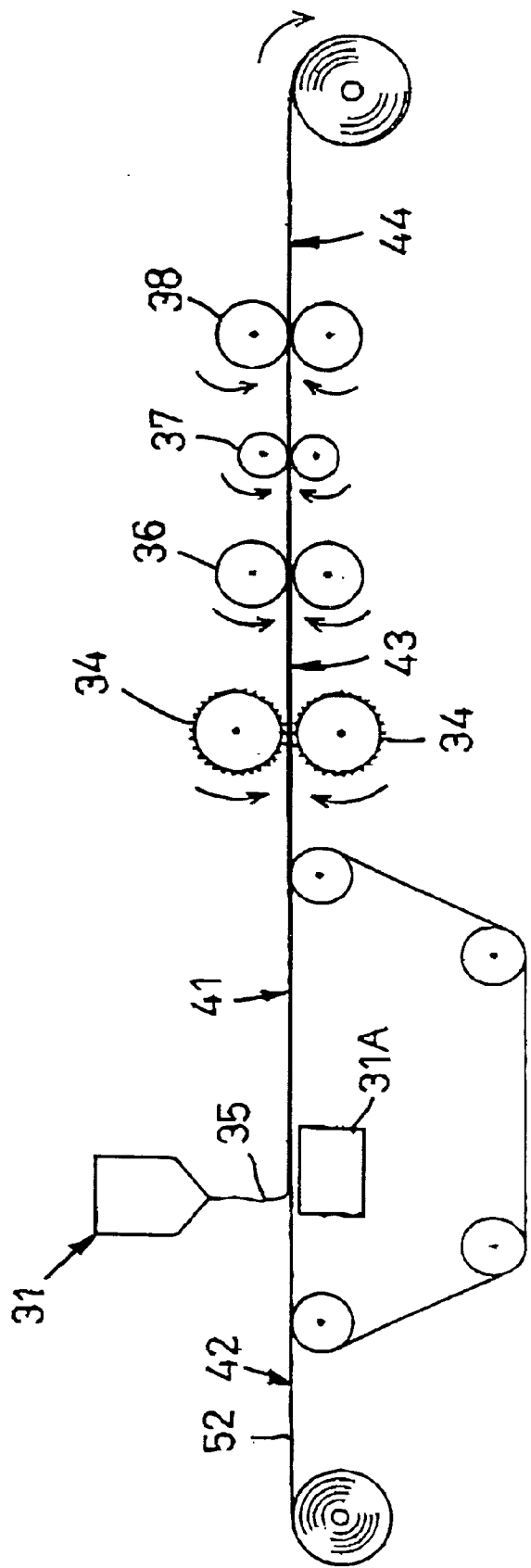
FIG. 3 is a diagram similar to FIG. 2 but illustrating steps of the process according to another embodiment of this invention for making the composite sheet.

FIG. 3 is a diagram similar to FIG. 2 but illustrating another preferred embodiment of the process according to this invention. According to this embodiment, a film 52 made of thermoplastic elastomer and having an elastic stretchability in the travelling direction of the belt 30 is fed as the second web 42 from the left hand of FIG. 3 and the first web 41 comprising the first continuous fibers 35 is fed onto the film 52. The first and second webs 41, 42 travel to the pair of embossing rolls 34, 34 in the same manner as in FIG. 2, between which the webs 41, 42 are intermittently bonded together to form the first composite web 43. The first composite web 43 is stretched as they further travels through the first—third pairs of rolls 36, 36; 37, 37; 38, 38 and then contracted to form the second composite web 44. By bonding the first web 41 with the second web in the form of the film 52 to form the bond regions 4 as shown in FIG. 1, it is possible to prevent the first and second webs 41, 42 from being easily separated from each other. This is true even if each of the bond regions 4 is dimensioned as small as in the order of 0.03~1 mm² and a total surface area of the bond regions 4 is dimensioned as small as in the order of 1~10% of the surface area of the second composite sheet 44. This is because the first web 41 is formed by the first continuous fibers 35. It should be understood here that the area of each bond region 4 may have the area varying in a range of 0.03~10 mm² and the total area thereof may vary in a range of 1~50% of the surface area of the second composite web 44.

The composite sheet 1 obtained by the process according to this invention is easily stretchable and offers a comfortable touch, so that the composite sheet 1 is suitable as cloth and/or elastic member in disposable garments such as disposable pants or disposable gowns used in medical site. The process according to this invention for making the elastically stretchable composite sheet enables the fibrous web in the composite sheet to have a basis weight lower than that in the conventional composite sheet because the stretchable fibrous web is laminated in its unstretched condition with the elastically stretchable web.

With the composite sheet of this invention, the component fibers of the fibrous web are stretched under a plastic deformation and have their diameter correspondingly reduced as the composite sheet is stretched once in the course of the process. At the same time, undesirable bonding and/or entangling among the component fibers themselves in the fibrous web and undesirable bonding between the fibrous web and the elastically stretchable web are loosened. Therefore, a relatively small force required to stretch the elastically stretchable web is sufficient as an initial force required to stretch the composite sheet so that the composite sheet may be easily stretched and offer a comfortable soft touch.

What is claimed is:

1. A process of making a composite sheet, said process comprising a step of bonding a first web made of thermoplastic synthetic fiber and having an inelastic stretchability in a first direction to at least one surface of a second web made of thermoplastic synthetic resin and having an elastic stretchability at least in said first direction and thereby to obtain the composite sheet having an elastic stretchability in said first direction;

wherein said first web is made of stretchable synthetic continuous fiber having a first breaking extension at least of 70% while said second web has a second breaking extension higher than said first breaking extension, and said first and second webs are bonded in accordance with the steps of:
 a. continuously feeding said first web in said first direction;
 b. continuously feeding said second web in said first direction so as to be placed upon said first web;
 c. bonding said first and second webs together intermittently at least along said first direction rather than in a second direction being orthogonal to said first direction, wherein said first web is laminated under no tension to said second web;
 d. stretching said bonded first and second webs at least in said first direction rather than in the second direction within a critical elasticity of said second web and a critical breaking extension of said first web; and
 e. elastically relaxing said stretched first and second webs to contract the webs and thereby to obtain said composite sheet.

2. The process according to claim 1 wherein said second web is any one of an elastically stretchable nonwoven fabric, a woven fabric and a stretchable film.

3. The process according to claim 1, wherein said second web is made of melt blown fiber.

4. The process according to claim 1, wherein said first web is made of melt blown fiber.

5. The process according to claim 1, wherein said step d includes a step of elastically stretching said second web and simultaneously stretching the synthetic fibers of said first web to cause plastic deformation of the synthetic fibers in said first direction.

6. The process according to claim 1, wherein said first and second webs are bonded together using any one of heatsealing, ultrasonic-sealing, needle punching and high pressure columnar water streams.

7. The process according to claim 1, wherein a pair of said first webs are bonded to both surfaces of said second web, respectively.

8. The process according to claim 7, wherein said respective first webs are different from each other in any one of basis weight, type of fibers and appearance.

9. The process according to claim 1, wherein said second web is made of elastically stretchable threads.

10. A process of making a composite sheet, said process comprising a step of bonding a first web made of thermoplastic synthetic fiber and having an inelastic stretchability in a first direction to at least one surface of a second web made of thermoplastic synthetic resin and having an elastic stretchability at least in said first direction and thereby to obtain the composite sheet having an elastic stretchability in said first direction;

wherein said first web is made of stretchable synthetic continuous fiber having a first breaking extension at least of 70% while said second web has a second breaking extension higher than said first breaking extension, and said first and second webs are bonded in accordance with the steps of:

a. continuously feeding said first web in said first direction;
b. continuously feeding said second web in said first direction so as to be placed upon said first web;
c. bonding said first and second webs together intermittently at least along said first direction rather than in a second direction being orthogonal to said first direction;
d. stretching said bonded first and second webs at least in said first direction rather than in the second direction within a critical elasticity of said second web and a critical breaking extension of said first web; and
e. elastically relaxing said stretched first and second webs to contract the webs and thereby to obtain said composite sheet;

wherein, after said step c, the synthetic fibers of said first web are loosened in said step d except those that have been bonded to the second web in said step c.

* * * * *